Jan. 12, 1971  J. F. STEVENSON  3,554,727
GROUNDING CIRCUIT FOR AUXILIARY ELECTRODE
IN GLASS GOB FORMING APPARATUS
Filed Jan. 2, 1968
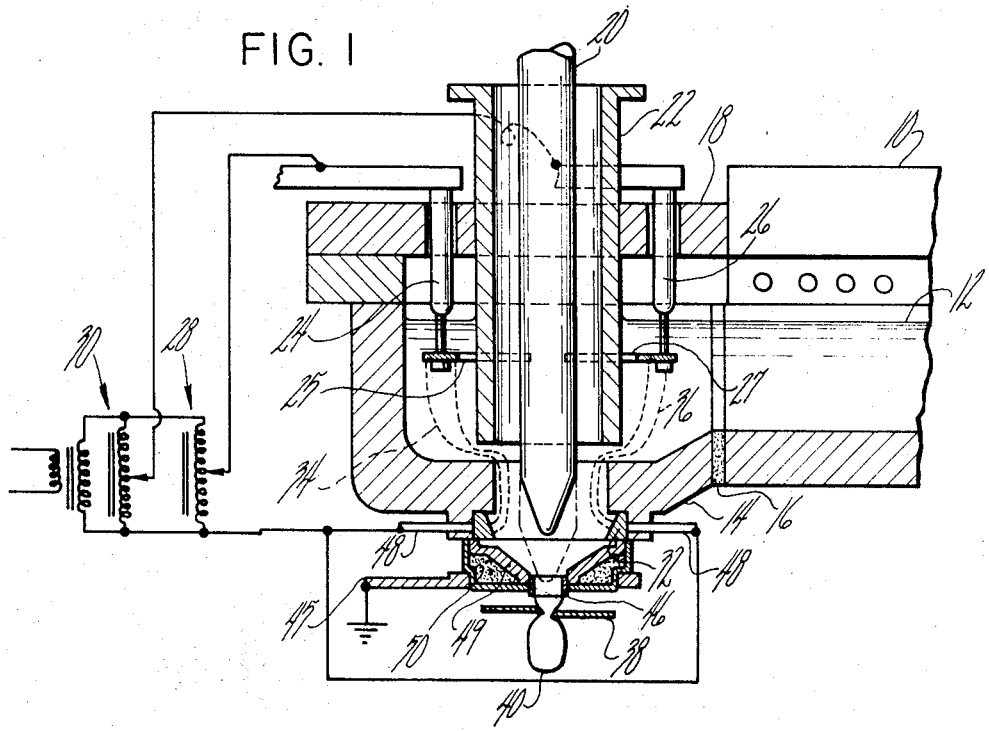
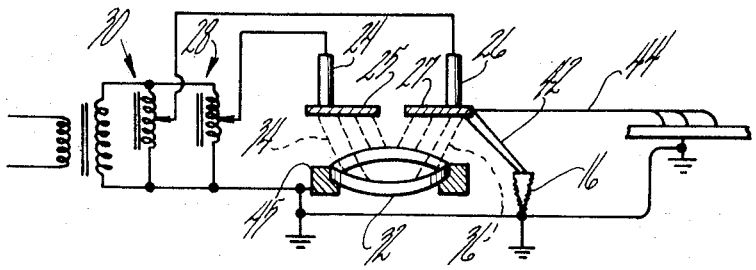
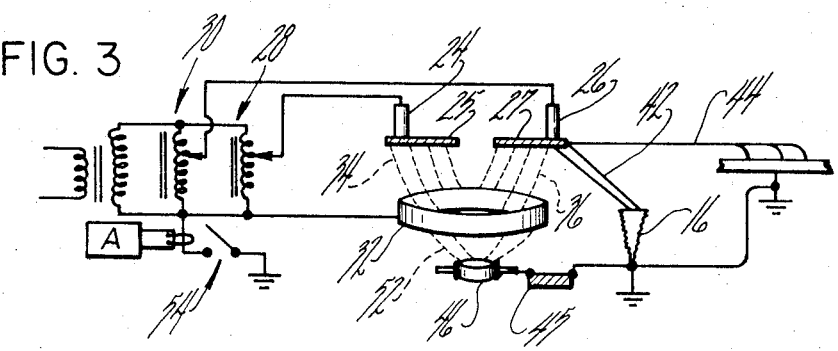
INVENTOR.
JAMES F. STEVENSON
BY
ATTORNEYS

United States Patent Office 3,554,727
Patented Jan. 12, 1971

3,554,727
GROUNDING CIRCUIT FOR AUXILIARY ELECTRODE IN GLASS GOB FORMING APPARATUS
James F. Stevenson, West Hartford, Conn., assignor to Emhart Corporation, Bloomfield, Conn., a corporation of Connecticut
Filed Jan. 2, 1968, Ser. No. 695,113
Int. Cl. C03b 5/02, 5/26
U.S. Cl. 65—327                                      1 Claim

ABSTRACT OF THE DISCLOSURE

A feeder bowl is mounted at one end of a glass feeding furnace, or forehearth, and a reciprocating mechanism feeds successive gobs of molten glass downwardly through an outlet spout in the bowl. Electrode means in the feeder bowl is maintained at a relatively high potential, and electric current flows downwardly therefrom toward a primary annular electrode adjacent the outlet spout. An auxiliary annular electrode, located below the primary one, defines the outlet spout and is maintained at ground potential to prevent arcing between the glass gob being ejected through the spout and the glass gob shearing apparatus normally provided below the feeder bowl.

SUMMARY OF THE INVENTION

This invention relates to electrodes which are immersed in molten glass to maintain a constant glass viscosity in a feeder bowl, and deals more particularly with a grounding circuit for an auxiliary electrode at the exit, or outlet spout, of the feeder bowl to assure that the glass gobs being formed are grounded electrically prior to being engaged by the shears, or other mechanisms in the glassware forming process.

BACKGROUND OF THE INVENTION

In heating molten glass during the gob forming process by means of electrodes immersed in the glass, prior art constructions disclosed circuitry for maintaining a pair of depending electrodes at a relatively high potential, and for maintaining a single annular electrode adjacent the outlet spout at ground potential. The molten glass is heated by the resistance offered to the flow of electricity between the depending electrodes and the annular electrode. Ideally, the gob of glass is at ground potential as it leaves the outlet spout. However, it has been found that the electric currents produced in the molten glass do not always follow the prescribed path to the grounded annular electrode. More particularly, stray, or fault currents to other grounded parts of the feeder bowl and forehearth are produced. Once these stray or fault currents are created, the gounded annular electrode receives a substantial portion of electrical energy through the conductive frame of the apparatus rather than through the molten glass between the depending electrodes and said grounded annular electrode. The defect is a self-perpetuating one and even after sufficient molten glass is provided on the exposed face of the annular electrode it has been found that the fault currents continue to exist unless they are interrupted in some way.

Accordingly, the primary object of the present invention is to provide a grounding circuit for the electrodes in a glass gob forming apparatus which circuit will eliminate, or at least minimize the deleterious effects of these fault currents.

The drawing shows a preferred embodiment of the invention and such embodiment will be described, but it will be understood that various changes may be made from the construction disclosed, and that the drawing and description are not to be construed as defining or limiting the scope of the invention, the claim forming a part of this specification being relied upon for that purpose.

BRIEF DESCRIPTION OF THE DRAWING

FIG. 1 is a vertical sectional view of a glass feeder bowl mounted at one end of a forehearth, with a reciprocating mechanism in the feeder bowl and with depending electrodes for heating molten glass by inducing currents directed downwardly toward an annular electrode. An auxiliary grounded electrode is provided in accordance with the present invention.

FIG. 2 is a schematic electrical diagram for a conventional apparatus for forming gobs of glass, that is without utilizing an auxiliary grounded electrode as shown in FIG. 1.

FIG. 3 is an improved wiring schematic for the apparatus shown in FIG. 1, utilizing an auxiliary grounded electrode as shown in FIG. 1.

DETAILED DESCRIPTION

Turning now to the drawing in greater detail, FIG. 1 shows a glass feeding furnace, or forehearth 10, through which molten glass 12 is delivered to a feeder bowl 14 at the left hand end of the forehearth 10. The feeder bowl is cemented in place, as indicated by the adhesive joint 16. The glass feeding bowl 14 has a top portion 18 and the lower wall thereof defines an opening in which an outlet spout structure is provided in a manner to be described.

Mechanism is provided in the feeder bowl for forming, successively, gobs of glass and for urging said gobs downwardly through the opening in the lower wall of the feeder bowl 14. Preferably, said means comprises a reciprocating plunger and tube combination, 20 and 22 respectively, each of which is operated by conventional means and need not be described in detail herein. For purposes of the present disclosure it is sufficient to note that the plunger 20 has a tapered lower end portion which is movable between the solid and the broken line positions shown in timed relationship with reciprocating movement of the shears 38. The tube 22 is adjustable from the position shown toward a position closer to or more remote from the lower inside surface of the feeder bowl 14 so as to adjust the amount of molten glass 12 running outwardly toward the bottom opening or orifice in the feeder bowl. Thus, predetermined quantities of molten glass can be allowed to pass between the lower end of the tube 22 and the inside surface of the feeder bowl 14, the tube being adjusted to control the total flow of glass, and the plunger being operable to cyclically force the charge of glass downwardly through the opening in the feeder bowl.

Since the actual quantity of glass ejected for each reciprocation of the plunger depends not only upon the length of time spent in each cycle of operation, but also upon the viscosity of the molten glass, electrode means is provided for heating the molten glass to a uniform temperature circumferentially around the tube 22 and also for heating the glass in the bottom opening of the feeder bowl. A pair of depending electrodes 24 and 26 extend downwardly through openings provided for this purpose in the cover 18 of the feeder bowl, and each electrode includes arcuately shaped conductive plates 25 and 27, respectively, which are immersed in the molten glass and extend at least part way around the circumference of the tube 22. Each of these electrodes 24 and 26, and their associated conductive plates 25 and 27 is fed alternating current from independently adjustable transformers, or powerstats 28 and 30, respectively.

The foregoing description of the apparatus of FIG. 1 may be substantially equivalent to that described in Pat. No. 3,080,737 issued to Gell et al., Mar. 12, 1963, but in the description to follow it will be apparent that the remaining portion of the apparatus shown in FIG. 1 differs substantially from that described in the above-mentioned patent. In accordance with the present invention, the feeder bowl 14 and more particularly the bottom opening in the lower wall thereof, is provided with an outlet spout structure having an internal shape not unlike that of a funnel. A primary annular electrode 32 is provided at the junction between the bottom opening of the bowl and the outlet spout, and is electrically connected to both adjustable transformers 28 and 30 as shown. As so constructed, the circuitry shown permits the depending electrodes 24 and 26 to be maintained at a relatively high potential, and the annular electrode 32 to be maintained at a relatively low potential so that a current can be created in the molten glass as indicated by the broken lines 34 and 36. Since the transformers 28 and 30 are adjustable, the current density in each of the paths 34 and 36 can be independently regulated to control the temperature of the molten glass circumferentially around the tube 22, and generally upstream of the primary annular electrode 32, so as to control the viscosity of the glass during the gob forming process.

Conventional practice calls for maintaining the electrode 32 at ground potential so that the glass gobs formed in the outlet spout or funnel shaped portion of the device do not carry any electrical charge, with the result that the shears, indicated generally at 38, can sever, successively, the gobs of glass without any arcing occurring between them and the glass gob 40. As shown in FIG. 2, however, when the electrode 32 is so grounded, the problem discussed above is encountered. More particularly, fault or stray currents are sometimes encountered, as depicted in FIG. 2 at 42 and 44. The fault current 42 for example, indicates some degree of conductivity in the adhesive sealant 16 used to join the feeder bowl 14 to the forehearth 10. As a result of the extensive iron work used in fabricating the forehearth and bowl it will be apparent that current leakage can occur between the depending electrode 26 for example and the sealing material 16, with the result that current is wasted from that required to heat the molten glass along the path 36. The line 44 in schematic FIG. 2 illustrates other fault current which may be grounded further upstream in the forehearth, and also shows that all of these currents combine, through a common ground in the iron frame of the apparatus 45 to provide a low resistance path of current to the circuitry for maintaining the annular electrode 32 at its predetermined electrical potential. Thus, electrical energy is shunted around the path along which electricity is intended to flow with the result that an uneven distribution of heat is provided circumferentially around the tube 22 and in the outlet spout generally. As mentioned above it has been found that even after the molten glass does in fact coat the entire surface of the annular electrode 32, these fault or stray currents continue to exist once they have been created in the manner just described.

In accordance with the present invention, a secondary or auxiliary annular electrode of smaller current carrying capacity than the annular electrode 32 just described is provided in the outlet structure for the purpose of grounding a gob of glass 40 as it is ejected from the spout. As a result of utilizing such an auxiliary electrode 46, the primary annular electrode 32 need not be maintained at ground potential, and in fact can be maintained at any convenient potential by insulating the electrode 32 from the frame of the apparatus as indicated schematically in FIG. 1. More particularly in FIG. 1 the annular electrode 32 is mounted on conductive rods 48, 48 which are electrically connected to the control circuitry as indicated, independently of any ground connection.

FIG. 3 shows in schematic fashion the effect of providing an auxiliary electrode 46 in the outlet spout. The fault, stray currents 42, 44 are grounded to the frame 45 of the apparatus without interfering with the control circuitry associated with the primary electrodes 24, 26 and 32. Whereas in the FIG. 2 arrangement considerable currents could be carried back to the control circuitry, in the FIG. 3 arrangement since a ground is not connected to the supply transformers, this precludes substantial current losses through the path indicated generally at 42 and 44.

The outlet spout portion of the feeder bowl 14 comprises a funnel shaped refractory orifice portion 49 which is held in place by a metal cup-shaped member 50 connected to the machine frame 45 and to ground as shown in FIG. 1. Insulating material is packed between the orifice 49 and cup-shaped housing 50 and the auxiliary annular electrode 46 is supported in the housing 50 as shown. Thus, the primary annular electrode 32 is considerably larger than the small bushing-type auxiliary electrode 46 with the result that little current is experienced along the path 52, shown in FIG. 3, between the auxiliary electrode 46 and the primary electrode 32. In fact, as a result of the high resistance offered to the flow of current from ground back to the primary annular electrode 32 little or unappreciable current loss is experienced utilizing an auxiliary electrode at ground potential in accordance with the present invention.

In order to ascertain the extent of current loss created by the adverse heating effects of the fault currents 42 and 44, an ammeter A may be provided between the control circuitry associated with the electrodes 24 and 26, for measuring the current drain when these transformers are grounded by the switch 54. If, when switch 54 is closed, the resulting ground return current is low, the system could be operated in a conventional manner so that the primary annular electrode 32 is operated at ground potential. If, on the other hand, the current read on the ammeter A is objectionable, then a more suitable operation will result if the primary electrode 32 is operated as depicted in FIG. 1 with the auxiliary electrode 46 actually operated at ground potential. Thus, there is provided an isolating circuit for said primary annular electrode 32 for determining whether the switch 54 should be left in its open or closed condition.

What is claimed is:

1. A glass gob forming apparatus comprising a feeder bowl of the type adapted for mounting on a forehearth furnace to receive molten glass, said bowl having a bottom opening which includes a downwardly open annular recess, mechanism for successively forming gobs of glass and for urging the glass downwardly through said bottom opening, electrode means in the feeder bowl, a primary annular electrode in said annular recess, orifice defining means below said annular electrode and cooperating therewith to define an outlet spout for the feeder bowl, said orifice defining means including an auxiliary electrode of annular configuration through which the molten glass passes just prior to discharge, electric circuit means for energizing said electrode means with respect to said primary annular electrode, a grounding circuit for said auxiliary annular electrode, and an isolating circuit for selectively grounding said primary annular electrode, said primary annular electrode being normally insulated from ground potential.

References Cited

UNITED STATES PATENTS

| | | | |
|---|---|---|---|
| 1,999,744 | 4/1935 | Wadman | 65—128 |
| 2,186,718 | 1/1940 | Ferguson | 65—128 |
| 2,710,306 | 6/1955 | Penberthy | 13—6 |
| 2,767,235 | 10/1956 | Herrold et al. | 13—6 |
| 2,919,297 | 12/1959 | Augsburger | 13—6 |
| 2,984,829 | 5/1961 | Augsburger | 13—6X |
| 3,291,584 | 12/1966 | Sheldon | 65—121X |
| 3,328,153 | 6/1967 | Augsburger | 65—327 |

FRANK W. MIGA, Primary Examiner

U.S. Cl. X.R.

65—128, 337; 13—6